US009883398B2

(12) United States Patent
Marquardt (10) Patent No.: US 9,883,398 B2
(45) Date of Patent: Jan. 30, 2018

(54) CONTACTLESS PROGRAMMING OF SUBSCRIBER IDENTITY MODULES

(71) Applicant: Giesecke & Devrient Mobile Security America, Inc., Dulles, VA (US)

(72) Inventor: Scott Marquardt, Washington, DC (US)

(73) Assignee: Giesecke+Devrient Mobile Security America, Inc., Dulles, VA (US)

( * ) Notice: Subject to any disclaimer, the term of this patent is extended or adjusted under 35 U.S.C. 154(b) by 0 days.

(21) Appl. No.: 15/402,034

(22) Filed: Jan. 9, 2017

(65) Prior Publication Data
US 2017/0118648 A1 Apr. 27, 2017

Related U.S. Application Data

(62) Division of application No. 14/635,543, filed on Mar. 2, 2015, now Pat. No. 9,572,015.

(51) Int. Cl.
*H04M 3/16* (2006.01)
*H04W 12/06* (2009.01)
(Continued)

(52) U.S. Cl.
CPC ........... *H04W 12/06* (2013.01); *H04W 4/008* (2013.01); *H04W 8/205* (2013.01); *G06K 7/0008* (2013.01); *H04W 8/245* (2013.01)

(58) Field of Classification Search
CPC . H04W 12/06; H04W 8/245; H04M 1/72519; G05K 7/0008; G06K 7/0008
(Continued)

(56) References Cited

U.S. PATENT DOCUMENTS

2001/0026539 A1 10/2001 Kornprobst et al.
2005/0054352 A1* 3/2005 Karaizman ....... H04M 3/42008
455/456.3
(Continued)

FOREIGN PATENT DOCUMENTS

EP 2395778 A1 12/2011
EP 2701414 A1 2/2014

OTHER PUBLICATIONS

International Searching Authority, International Search Report and Written Opinion in PCT/US2016/018739, dated Sep. 14, 2016.
(Continued)

*Primary Examiner* — Danh Le
(74) *Attorney, Agent, or Firm* — Drinker Biddle & Reath LLP (57) ABSTRACT

Exemplary embodiments of the present invention include receiving subscriber identity information for a cellular network at a mobile communication device via a short-range wireless communication network. The subscriber identity information is received from a device issued by a provider of the cellular network. Exemplary embodiments further include storing the subscriber identity information at a subscriber identity module embedded in the mobile communication device. Exemplary embodiments additionally include transmitting the subscriber identity information from the subscriber identity module to a server of the provider for authenticating a subscriber of the cellular network. Exemplary embodiments still further include receiving, from the server of the provider, authorization for the subscriber to access the cellular network, and accessing the cellular network via the mobile communication device.

5 Claims, 4 Drawing Sheets

(51) Int. Cl.
*H04W 4/00* (2009.01)
*H04W 8/20* (2009.01)
*H04W 8/24* (2009.01)
*G06K 7/00* (2006.01)

(58) Field of Classification Search
USPC .................. 455/411, 418, 41.2; 340/10.1
See application file for complete search history.

(56) References Cited

U.S. PATENT DOCUMENTS

| | | |
|---|---|---|
| 2006/0205434 A1 | 9/2006 | Tom et al. |
| 2007/0287471 A1* | 12/2007 | Wood ............... H04L 63/08 455/456.1 |
| 2009/0181653 A1* | 7/2009 | Alharayeri ............ H04W 4/02 455/414.1 |
| 2009/0186603 A1* | 7/2009 | Usami ............ H04M 1/274516 455/414.2 |
| 2010/0123556 A1* | 5/2010 | Rofougaran ......... G06K 7/0008 340/10.1 |
| 2010/0299744 A1 | 11/2010 | Mardiks |
| 2011/0059773 A1 | 3/2011 | Neumann et al. |
| 2011/0165896 A1* | 7/2011 | Stromberg ............. G06Q 20/32 455/466 |
| 2012/0088473 A1* | 4/2012 | Jussila .................. H04W 12/06 455/411 |
| 2012/0089679 A1* | 4/2012 | Gold ................ G06F 17/30867 709/204 |
| 2013/0017862 A1 | 1/2013 | Lee et al. |
| 2013/0331096 A1 | 12/2013 | Rogan |
| 2014/0024361 A1 | 1/2014 | Poon et al. |
| 2014/0106713 A1 | 4/2014 | Skog et al. |
| 2014/0237228 A1 | 8/2014 | Robison et al. |
| 2015/0099550 A1* | 4/2015 | Alharayeri ............. H04L 51/00 455/456.3 |

OTHER PUBLICATIONS

International Searching Authority, International Preliminary Report on Patentability issued in counterpart International Patent Application No. PCT/US2016/018739, dated Sep. 14, 2017.

* cited by examiner

CONTACTLESS PROGRAMMING OF SUBSCRIBER IDENTITY MODULES

CROSS REFERENCE TO RELATED APPLICATION

This application is a divisional of U.S. patent application Ser. No. 14/635,543, filed on Mar. 2, 2015, the entire content of which is incorporated herein by reference.

TECHNICAL FIELD

The present disclosure relates generally to subscriber identity modules, and more specifically to contactless programming of subscriber identity modules.

BACKGROUND

Wireless communication networks provide various communication services such as telephony, video, data, messaging, and broadcasts. Such networks support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology. The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS supports enhanced 3G data communications protocols, such as High Speed Packet Access (HSPA), which provides greater data transfer speeds and capacity to associated UMTS networks. Other example networks include GPRS/EDGE, CDMA/DO, or EUTRAN (4G LTE). Such wireless communication networks may follow standards implemented by the European Telecommunications Standards Institute (ETSI) or the Third Generation Partnership Project (3GPP), for example.

Contemporary wireless devices frequently include a subscriber identity module (SIM) card to facilitate communication with a communication network via a subscription for the designated voice or data subscription of the wireless device. SIM cards include information and provide identity documentation, authentication, and other information regarding a user of the wireless device via an embedded integrated circuit component. The integrated circuit component securely stores an international mobile subscriber identity (IMSI) with a key that is used to identify and authenticate subscribers on connected mobile devices, such as cell phones, tablets, and computers. Various other information may also be stored on the SIM card, such as an address book, text messages, network names, or other carrier or subscriber information. This information may also be read from the SIM card and be made available to the wireless device.

A SIM card is a plastic card with a SIM circuit and electrical contacts embedded therein. SIM cards conform to various standards, characterized by the size of the card. The most recent and smallest SIM card size is Nano-SIM, with Micro-SIM, Mini-SIM and the Full-size SIM cards preceding it.

SIM cards provide many benefits. SIM cards can be transferred between mobile devices to provide a generic, compatible identification and storage mechanism for subscribers using multiple device platforms. For example, a mobile network subscriber may remove his/her SIM card from a first mobile device and insert it into a second mobile device. After an authentication and initialization process, the second device may be linked to the subscriber's account. The subscriber may then use the second device to access the subscription network for as long as the SIM card remains connected/inserted in the device. Further, a new subscriber may use a different SIM card to unlock network access for additional wireless networks. For example, during an international trip, a US wireless network subscriber may purchase a short term subscription to a foreign wireless network. The user may connect to the foreign network by removing the US wireless network SIM card from his/her mobile device and inserting the foreign wireless network SIM card. After an authentication and initialization process, the mobile device may access the foreign wireless network. It would be advantageous to use the authentication capabilities of the SIM card to perform other services provided by today's high-technology mobile devices that perform a variety of computing and communication functions.

SUMMARY OF THE INVENTION

According to aspects of the present disclosure, a method includes receiving subscriber identity information for a cellular network at a mobile communication device via a short-range wireless communication network, such as, for example, Near Field Communication ("NFC") and non-cellular networks. The subscriber identity information is received from a device that, in exemplary embodiments, are issued by a provider of the cellular network. The method further includes storing the subscriber identity information at a subscriber identity module embedded in the mobile communication device. The method additionally includes transmitting the subscriber identity information from the subscriber identity module to a server of the provider for authenticating a subscriber of the cellular network. The method still further includes receiving, from the server of the provider, authorization for the subscriber to access the cellular network, and accessing the cellular network via the mobile communication device.

Other objects, features, and advantages will be apparent to persons of ordinary skill in the art from the following detailed description and the accompanying drawings.

BRIEF DESCRIPTION OF THE DRAWINGS

For a more complete understanding of the present invention, needs satisfied thereby, and the objects, features, and advantages thereof, reference now is made to the following description taken in connection with the accompanying drawings.

DETAILED DESCRIPTION OF THE INVENTION

Removable SIM technology has set the standard for the development of mobile telephony subscriber identity management techniques over the past 25 years. SIM cards allow mobile network operators to authenticate a subscriber using a secure token that is stored in an integrated circuit (IC) on a small and inexpensive card that can be easily distributed to subscribers. SIM cards also provide subscribers with a means for preserving their identity and other personal information across devices or while upgrading handset technology. SIM cards additionally allow device manufacturers to market a single device to different markets around the world by providing a mechanism for abstracting subscriber and carrier information from the device itself. Use of SIM technology is nearly universal in mobile networks across the world.

SIM technology has been modified over the years to include additional features beyond subscriber authentication. For example, the format and specifications of SIM cards have changed to accommodate smaller device form factors. Further, smaller SIM card form factors allow more device space to be used to accommodate memory, processor, cooling units, screens, busses, and other critical internal device components. Future devices may have even less internal device room to dedicate to accommodation of removable SIM modules. SIM functions may also be implemented through the mobile device and software via an eSIM platform.

One design aspect affecting further miniaturization of SIM technology is electrical contact surface area requirements. Electrical contacts are necessary in traditional SIM card technology for connecting to corresponding pins in the receiving mobile device. When the SIM card is inserted in the receiving mobile device, the pins of the mobile device touch the contacts of the SIM card, and an electrical circuit is created between the mobile device and the SIM card when the device is powered on. Power is supplied to the embedded IC of the SIM card, which allows the information stored in the SIM card to be loaded into a memory on the mobile device. These contacts essentially allow SIM cards to be swapped freely in and out of compatible devices by creating a standard interface for mobile devices that are designed to retrieve information, such as subscriber identity information, from SIM cards.

However, various technologies have arisen that allow for transmitting and/or receiving information, such as the information stored on a SIM card, via wireless means. For example, WIFI, BLUETOOTH, and NFC technologies each permit high-bandwidth radio communications between devices in varying degrees of proximity to each other. Further, these devices may communicate with and power un-powered chips, such as tags or contactless cards. In other words, wireless technologies have advanced to the point where electrical contacts may not be necessary for retrieving subscriber identity information from a programmable card. Additionally, wireless technologies permit wireless re-programming of subscriber information on embedded cards.

Another technological limitation of electrical contacts is the amount of surface area required for ensuring a reliable electrical card-to-device connection. For example, the surface area of the electrical contacts must be large enough to permit some variance in the way the SIM card fits within the mobile device. If one SIM card sits even slightly higher within a mobile device after being inserted into the mobile device, the electrical connection with the SIM card is not made, and the information on the SIM card cannot be read. Further, one user may firmly press the SIM card into place, while another user may press the SIM card more gently into place. If the contacts on the SIM card are not large enough to contact the pins while tolerating these variances in positioning, the electrical connection between the device and the SIM card is not made, and subscriber information is not read. Any type of manual card configuration or placement design requires such tolerance in contact/pin design.

Additionally, the protective packaging of the SIM card uses additional space. For example, IC's that are embedded within device packaging or even within the chip substrate do not require separate protective packaging from the exterior shell that encloses the device. Removable cards mainly require this protective packaging so that they can be transferred between devices without damaging the circuit contained therein.

One design that significantly reduces the surface area required for creating and maintaining secure, reliable electrical connections is soldering or permanently connecting pins or contacts to the receiving chip or device. One benefit of such a design is that soldering creates a more permanent contact and thus an electrical connection that is not easily interrupted. Another benefit is the reduced size required for pins or contacts. A small amount of solder creates a contact between a microscopic pin and a connecting gate or conductive substrate.

Further, a permanent connection design may also eliminate the need for protective packaging around a subscriber identification unit. Thus, such a design even further reduces size limitations of legacy SIM technologies.

However, while soldered or permanently connected cards significantly reduce the size of subscriber identity modules, such modules are, by design, not easily removable or replaceable. Thus, such a design eliminates one of the great benefits of SIM technology. For example benefits include transferability of SIM cards between different mobile devices and the ability to use different mobile network accounts with a single device. Accordingly, wireless communication network carriers and mobile device manufacturers have continued to utilize legacy SIM formats.

Certain embodiments of the present disclosure describe a configuration whereby the current benefits of removable SIM formats are maintained while also facilitating the benefits of a permanently embedded or connected module by affixing an authentication device (i.e., a subscriber identity module) within a mobile device or handset. Such a solution may be enabled by the use of wireless communication technologies, such as NFC, to program or update subscriber credentials on a mobile device by using a contactless card or an NFC antenna. In certain embodiments, the configuration has been contemplated in such a manner that it may be deployed in current wireless network subscription plans. Thus, the present disclosure may serve immediate benefits to those wireless network providers and subscription management services.

Figure 1:
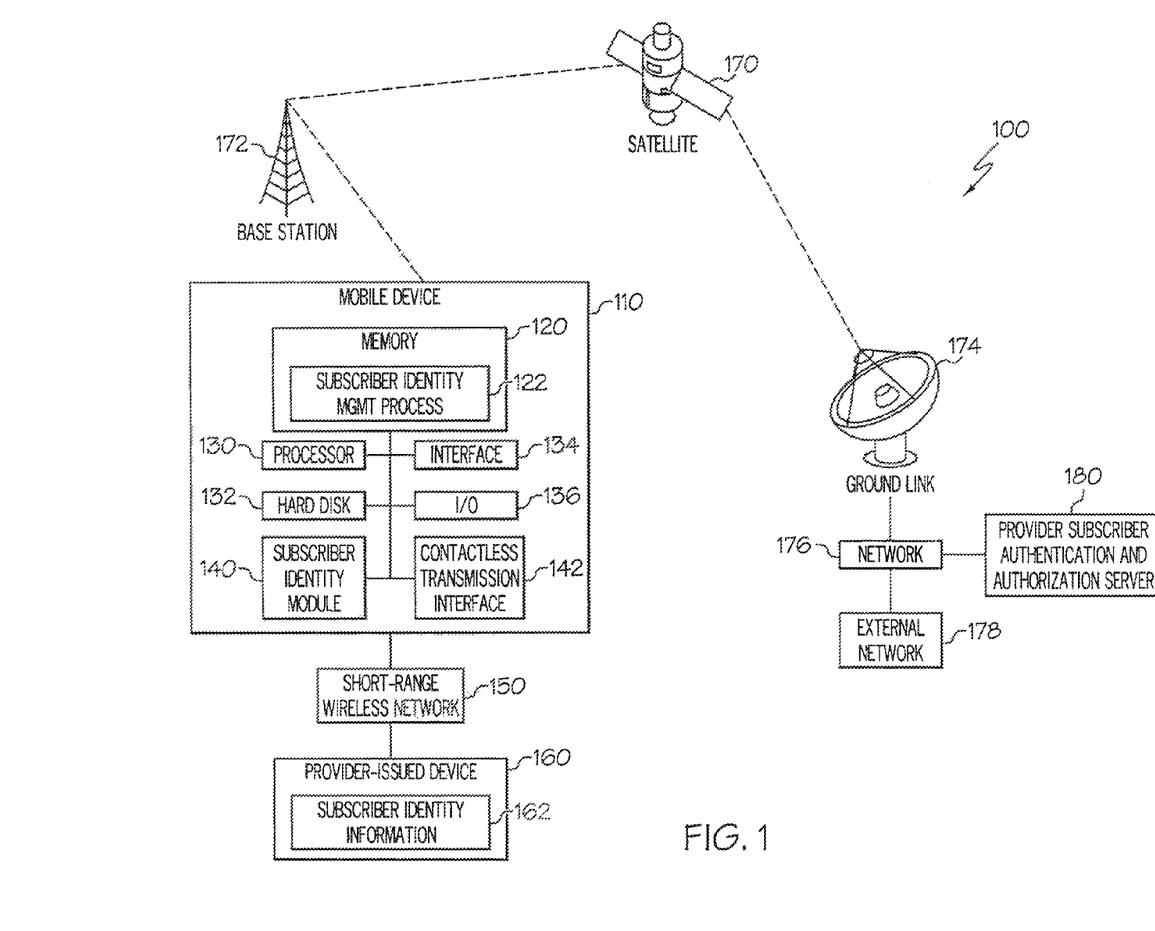
FIG. 1 illustrates a high level block diagram of a system for contactless programming of subscriber identity modules in accordance with a particular non-limiting embodiment of the present disclosure.

With reference to FIG. 1, a system 100 for contactless programming of subscriber identity modules is illustrated in accordance with a particular exemplary embodiment of the present disclosure. System 100 includes mobile device 110, provider-issued device 160, a wireless communication network including base station 172, satellite 170, and ground link 174, and provider subscriber authentication and authorization server 180. Mobile device 110 includes memory 120, processor(s) 130, hard disk 132, interface 134, input/output 136, embedded subscriber identity module 140 and contactless data transmission interface 142. Contactless data transmission interface 142 creates a secure short-range wireless network 150 with provider-issued device 160, which contains subscriber identity information for one or more wireless network subscribers. In certain embodiments, the short-range wireless network includes an NFC communication network between two devices which each have an antenna for enabling radio frequency communications. For example, the provider-issued device 160 includes an NFC communications terminal as part of a cell phone, computer, or other suitable device. In certain embodiments, the short range wireless network includes a radio frequency communication network between one device which transmits interrogation radio frequency signals to a smart card, which uses an inductor to store those signals and rectify them to power embedded circuitry. The embedded circuitry in turn transmits a low power signal to the mobile device that includes subscriber identity information. In exemplary embodiments the provider-issued device 160 comprises a smart card that may be distributed by a wireless network service provider to a subscriber. The subscriber uses the smart card to activate mobile device 10 with a wireless network and access the wireless network.

In certain embodiments, mobile device 110 receives subscriber identity information from provider-issued device 160. For example, memory 120 runs a subscriber identity management process 122 that operates contactless data transmission interface 142 to receive subscriber identity information 162 over short-range wireless network 150. Subscriber identity management process 122 is loaded into memory 120 by processor 130. Subscriber identity management process loads subscriber identity information 162 into subscriber identity module 140, which stores subscriber identity information in persistent storage.

In certain embodiments, subscriber identity management process 122 communicates via a wireless communication network with a provider subscriber authentication and authorization server 180 to activate mobile device 110 with the network provider. For example, subscriber identity management process 122 loads subscriber identity information and other authenticating credentials, tokens, keys, cryptographic cyphers, and the like, and transmits the subscriber identity information and other necessary information to provider subscriber authentication and authorization server 180. Other information loaded from subscriber identity module 140 may aid in creation of a secure link or channel to the provider's server 180 before activating mobile device 110.

In certain embodiments mobile device 110 receives an activation signal from provider subscriber authentication and authorization server 180. Mobile device 110 accesses external network 178 via the wireless communication network 176.

Figure 2:
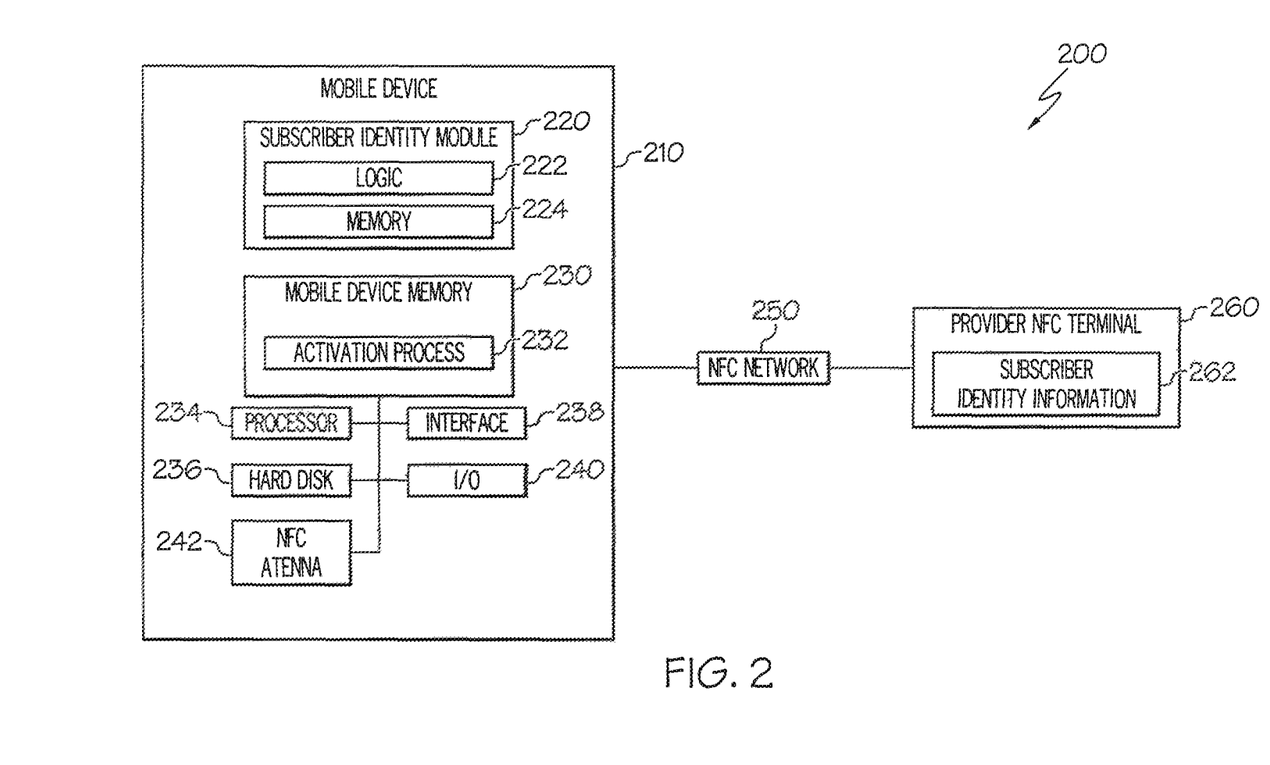
FIG. 2 illustrates a block diagram of a system for contactless programming of subscriber identity modules in accordance with a particular non-limiting embodiment of the present disclosure.

With reference to FIG. 2, a system 200 for contactless programming of a subscriber identity module is illustrated in accordance with an exemplary embodiment of the present disclosure. System 200 includes mobile device 210, which includes subscriber identity module 220, mobile device memory 230, processor 234, hard disk 236, interface 238, input/output 240, and NFC antenna 242. System 200 additionally includes provider NFC terminal 260. In certain embodiments, NFC terminal 260 is a stand-alone communication terminal, which accesses a memory to transmit subscriber identity information 262 over a communication network 250.

In certain embodiments, NFC terminal 260 is connected to and/or embedded within another device, such as a smartphone, tablet, personal computer, or other device. For example, a mobile wireless network provider issues to its sales employees a tablet that is configured to process sales transactions, process mobile network plan bill payments, provide demonstrations to consumers, and provide other helpful in-store sales data. The tablet is further configured with an NFC terminal that includes an antenna for activating mobile devices. Sales associates use the tablets to activate mobile devices so that subscribers are able to connect to the mobile wireless network. For example, the sales associate points the NFC terminal 260 at the mobile device and holds the NFC terminal 260 within a predetermined distance of the device. Network 250 is created using radio frequency signals, which is a short-range wireless communication network. In this example, NFC terminal 260 can access subscriber identity information 262 from the connected device.

In certain embodiments, NFC terminal 260 also retrieves personal information of the subscriber from mobile device 210. For example, a user stores contacts and other personal information on mobile device 210, such as in hard disk 236 and/or subscriber identity module memory 224. Subscriber identity module 220 transmits contact information details via network 250 to the provider issued NFC terminal 260. NFC terminal 260 stores the subscriber information, such as the subscriber contact details, locally and/or remotely on either one or more of a connected device or a remote subscriber information server.

In certain embodiments, provider NFC terminal 260 retrieves subscriber identity information from a server via a communications network. For example, NFC terminal 260 includes a memory and logic for processing instructions, such as instructions from a subscriber identity management process. NFC terminal 260 creates a secure network connection with a remote server of the wireless network provider.

In exemplary embodiments the server is a subscriber management server. A sales associate or other user creates an account for a subscriber. For example, the tablet or smart device that was issued to the sales associate includes software for creating new user accounts or editing existing user accounts via a secure network connection to a provider server. The newly created account is created at the server and unique identifiers are created for the new subscriber.

In certain embodiments, the subscriber may also purchase a new mobile device, such as mobile device 210. The mobile device includes, inter alia, a subscriber identity module 220. The subscriber identity module may be removable and/or permanently embedded within mobile device 210. For example, subscriber identity module 220 that is embedded in mobile device 210 includes certain advantages over removable subscriber identity modules. The subscriber identity module 220 contains certain information pre-loaded onto it. The pre-loading occurs during device manufacturing. In certain embodiments, a sales associate pre-loads security information onto the device before, during, and/or after a sale is made.

The sales associate programs the subscriber identity module with subscriber information using the provider-issued NFC terminal 260. For example, as part of an activation process 232, when a user account is created, subscriber identity information is generated for the new subscriber. NFC terminal 260 retrieves the subscriber identity information for the user based on identifying information of the subscriber, such as the subscriber's name, account number, address, social security number, or the like. NFC terminal 260 uses this subscriber information to program subscriber identity module 220, which uses logic 222 with NFC antenna 242 to receive the subscriber identity information from the NFC terminal and store the subscriber identity information in memory 224. Subscriber identity module 220 using logic 222 then begins an activation process 232 using a network (either wireless or wired) to connect to a provider server, such as a provider authentication and authorization server. Subscriber identity information is used during the activation process to authenticate the subscriber and the mobile device. Information regarding the mobile device is stored at the provider's server. Additional subscriber identity information is retrieved from the provider's server and stored in memory 224 of subscriber identity module 220.

In one example, retail chains are maintained where subscribers purchase handsets and register for network subscription plans. Handsets include any mobile communication device, tablet, smartphone, smart-watch, or the like. Some devices include an embedded subscriber identity module. In certain embodiments, the subscriber identity module includes authentication information for establishing a secure network connection with a network provider server during activation. Such a store may include a terminal for wirelessly programming mobile devices. New mobile devices, such as mobile device 210, may include generic subscriber identity modules 220. Subscribers or new users purchase mobile devices, and sales associates use NFC terminal 260 to program subscriber identity information for the subscriber or new user onto the subscriber identity module. The subscriber subsequently activates the mobile device using any network connection, such as a home or in-store WIFI connection.

Figure 3:
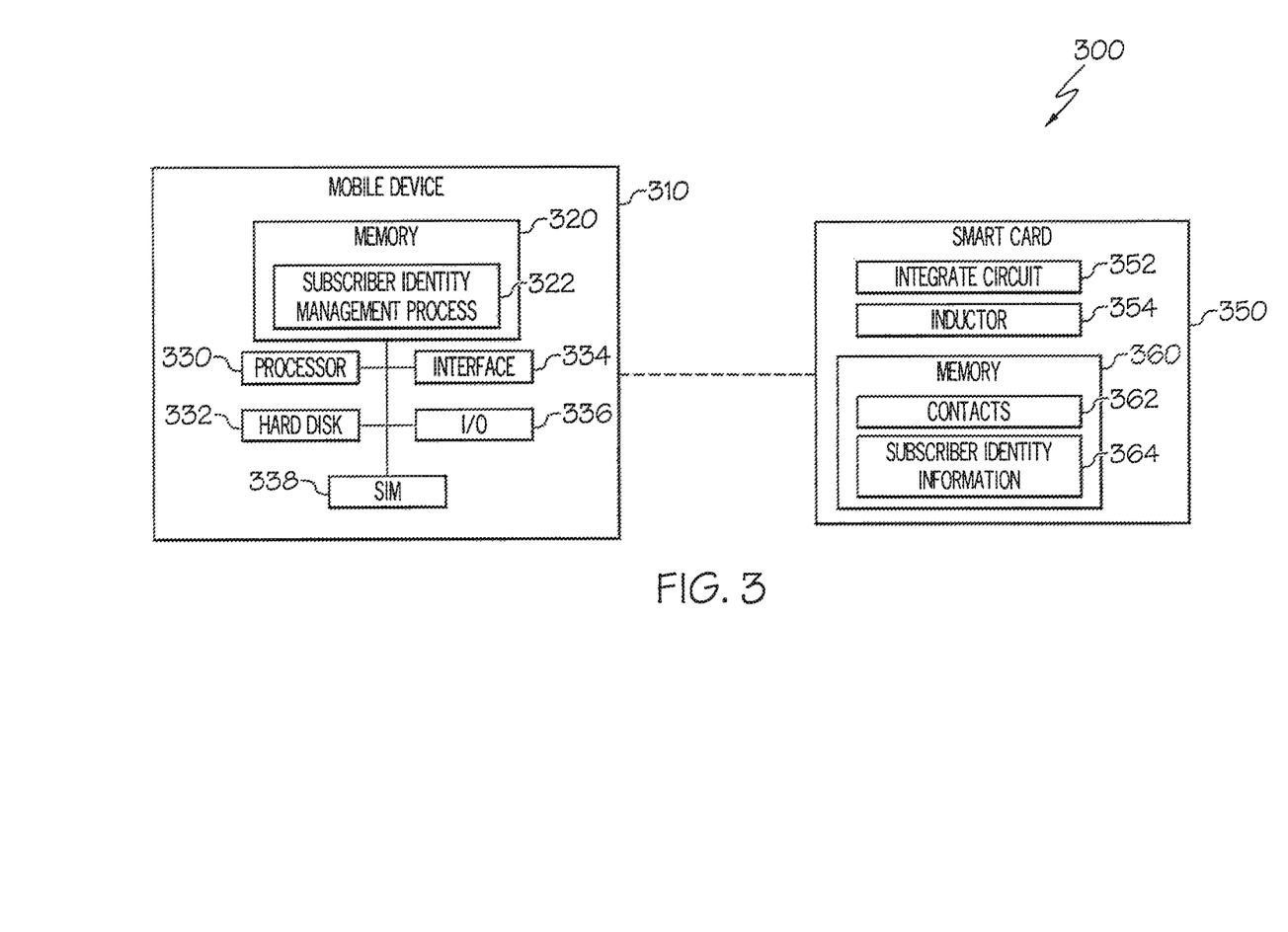
FIG. 3 illustrates a block diagram of a system for contactless programming of subscriber identity modules in accordance with a particular non-limiting embodiment of the present disclosure.

With reference to FIG. 3, a system 300 for contactless programming of subscriber identity modules is illustrated in accordance with a particular non-limiting embodiment of the present disclosure. System 300 includes mobile device 310 and smart card 350. Mobile device 310 includes memory 320, processor(s) 330, hard disk 332, interface 334, input/output 336, and subscriber identity module (SIM) 338. Smart card 350 includes integrated circuit component 352, inductor (i.e., antenna) 354, and memory 360. The memory is used to store subscriber identity information. In certain embodiments, memory 360 is used to store contacts 362 of the mobile device user or wireless network subscriber. In certain embodiments, smart card 350 includes a separate antenna element for receiving interrogating signals (shown integrated with inductor 354 in FIG. 3). Inductor 354 receives and stores power from the antenna element. Inductor 354 powers integrated circuit 352 with the stored power and powers the antenna element to transmit data processed by integrated circuit 352.

In certain embodiments, smart card 350 subscriber identity information 364 is similar to subscriber identity information distributed in removable subscriber identity modules of today. In certain embodiments, the same useful characteristics as today's SIM cards are incorporated into smart card 350. For example, smart card 350 has a small profile, is portable, and is generic. In other words, smart card 350 can be used to program mobile device 310, as well as other mobile devices equipped with contactless card reading equipment with an embedded SIM 338 module. In certain examples, smart card 350 is used to re-program removable SIM cards.

In certain embodiments, mobile device 310 is equipped with a smart card or contactless card reader. The contactless card reader creates a wireless network with smart card 350 when it is placed within a certain distance of mobile device 310. For example, mobile device 310 automatically transmits interrogating radio frequency signals for locating and creating wireless networks with smart cards. In certain embodiments, mobile device 310 is placed in an activation mode by a user. The interrogating signals are transmitted only during this activation mode so as to extend battery life during normal usage periods.

In certain embodiments, smart card 350 is programmed with subscriber identity information including a unique identifier and other security information. The unique identifier is not linked to a specific subscriber account when it is created. Instead it is noted by the provider and held in a bank until it is issued to a particular user, such as after a phone or in person point of sale transaction in which a user purchases a new mobile device with a mobile network subscription plan.

During an activation process, subscriber identity information is transmitted from smart card 350 to mobile device 310 and stored in SIM 338 of mobile device 310. A subscriber identity management process 322 creates a secure connection with a subscriber identity management server that is hosted by the network provider. The subscriber is authenticated using mobile device 310 information, subscriber identity information, and personal information of the subscriber, such as an account identifier and/or name of the subscriber.

Such personal information is then loaded onto additional devices as the subscriber desires. For example, if the subscriber updates his/her handset to a different model, the contactless card, or smart card 350, can be used to load personal information of the subscriber, such as contacts and settings, in addition to the subscriber identity information. Thus, this feature of removable SIM technologies is preserved.

Various other embodiments of the present disclosure, beyond merely an NFC terminal and/or a smart card are contemplated by the present disclosure. The examples above are merely used for explanatory purposes only and should not be construed to limit the scope of the present disclosure.

Figure 4:
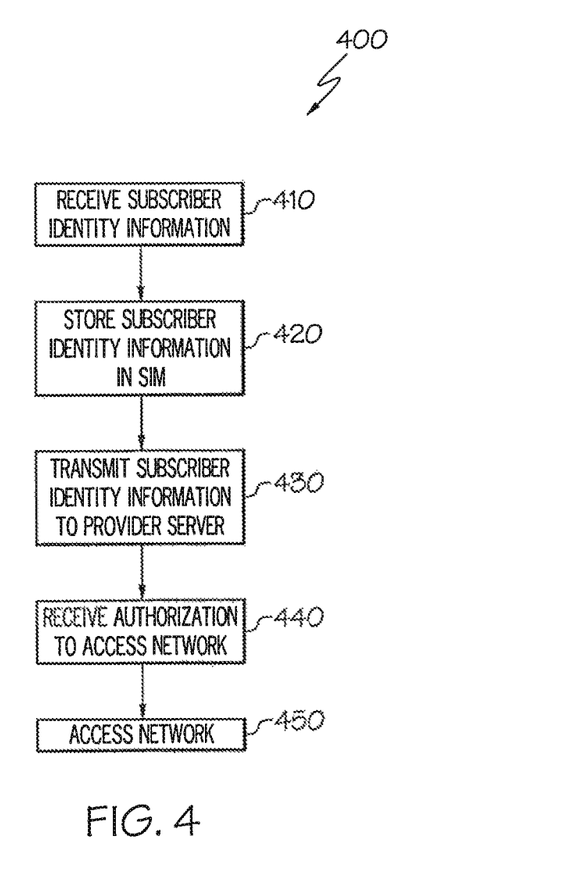
FIG. 4 illustrates a flow chart of a method for contactless programming of subscriber identity modules in accordance with a particular non-limiting embodiment of the present disclosure.

With reference to FIG. 4, a method for contactless programming of subscriber identity modules is illustrated in yet another non-limiting embodiment of the present disclosure 400. At step 410, subscriber identity information is received. For example, subscriber identity information is received at a mobile device.

At step 420, the subscriber identity information is stored in the subscriber identity module of the mobile device. For example, a bus connects a special identity module in the mobile device to a mobile device processor. The processor stores the subscriber identity information in the subscriber identity module.

At step 430, the subscriber identity information is transmitted to a provider server. In certain embodiments, this occurs during an activation process. The subscriber initiates this activation process using a home network or an in-store network. In certain embodiments, a sales associate initiates this activation process. In certain embodiments, upon receiving subscriber identity information the mobile device begins the activation process automatically. In certain embodiments the activation process begins the first time that the mobile device is connected to a network. In other words, the activation process automatically begins at the first chance that it can.

At step 440, authorization to access the network is received. In certain embodiments, authorization is received after an activation process completes. The activation process includes transmitting and receiving subscriber information between a mobile device and an activation server. The activation server grants the mobile device permission to access a mobile wireless network hosted by the provider.

At step 450, a subscriber or other user uses the mobile device to access an external network using the mobile network provided by the provider.

In certain embodiments, contactless cards may be distributed in the same way that SIM cards are sold in existing wireless network subscription plan implementations. For example, a traveler arriving in a foreign airport after an international flight buys a local network-access subscription (e.g., a prepaid subscription) for use with an existing handset device by purchasing a contactless card programmed with subscriber identity information. As another example, consumers who wish to upgrade their mobile device but want to preserve their network credentials and associated data (e.g., a SIM-based address book) may use a contactless card to first update registers on the contactless card with associated data stored on the mobile device, and then initialize or program the new device with network credentials and associated data stored on the contactless card.

In certain embodiments, handsets may be loaded with mobile network credentials before being shipped to mobile network operators so that they are ready to be sold when they reach the network operator's retail channels. For example, device manufacturers may pre-load certain devices with subscriber identity information. Once a consumer purchases the device, the device is initialized by interacting with a server and the subscriber's information is linked to the subscriber identity information pre-loaded on the mobile device.

A similar process may occur in legacy subscriber identity systems with removable SIM cards. However, point-of-sale pairing processes are used more often. These point of sale processes may also be improved by the teachings of the present disclosure.

Mobile network operator retail locations may have a choice of management methods. For example, smaller retail locations, such as mall kiosks, may use contactless cards in a similar way that SIM cards are used in legacy subscriber identity systems today. That is to say, they may load credentials onto the handset at the time that the device is sold, where the handset is then activated over the network.

As another example, larger retail locations may install and use NFC devices as a replacement for the activation terminals used in legacy subscriber identity systems. NFC communication mechanisms enable larger and more complex and secure credentials to be loaded with a high-bandwidth, secure data connection, without depending on network availability and signal strength. Thus, the teachings of the present disclosure may present a framework for improving the current subscriber identity management systems while avoiding the pitfalls that were previously thought to be unavoidable.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

Any combination of one or more computer-readable media may be utilized to store computer-readable instructions described herein. The computer-readable media may be a computer-readable signal medium or a computer-readable storage medium, for example. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of such a computer-readable storage medium include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, a subscriber identity module (SIM) card or other universal integrated circuit card (UICC or eUICC), memory integrated with or separate from the wireless device, or any suitable combination of the foregoing or other data carriers. In the context of this document, a computer-readable storage medium may be any tangible medium that can contain, or store a program for use by or in connection with an instruction execution system, apparatus, or device.

Aspects of the present disclosure are described herein with reference to flowchart illustrations and/or block diagrams of methods, apparatuses (including systems), and computer program products. Individual blocks of the flowchart illustrations and/or block diagrams, and combinations of blocks in the flowchart illustrations or block diagrams, may be implemented by computer program instructions, for example. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the function(s) specified in the flowcharts or block diagram block(s).

These computer program instructions may also be stored in a computer-readable medium. When accessed from the computer-readable medium and executed, the computer program instructions may direct a computer, other programmable data processing apparatus, or other devices to function in a particular manner, such that the instructions when stored in the computer-readable medium produce an article of manufacture including instructions that, when executed, cause a computer to implement the function(s) specified in the flowchart or block diagram block(s). The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the function(s) specified in the flowcharts or block diagram block(s). For example, wireless devices described herein are examples of such programmable data processing apparatuses.

Aspects of the present disclosure may be implemented by various combinations of apparatuses, devices, systems, or components thereof, for example. Reference in the appended claims to an apparatus, device, or system or a component thereof being configured to or operable to perform a particular function encompasses that apparatus, system, component, or device, whether such apparatus, system, component, or device or such particular function is activated, turned on, or unlocked, as long as that apparatus, system, or component is so configured or operable.

While the invention has been described in connection with various example structures, configurations, and illustrative implementations, it will be understood by those skilled in the art that other variations and modifications of the structures, configurations, and implementations described above may be made without departing from the scope of the invention. For example, the scope of this application comprises all possible combinations of the various elements and features disclosed and incorporated by reference herein, and the particular elements and features presented in the claims and disclosed and incorporated by reference above may be combined with each other in other ways within the scope of this application, such that the application should be recognized as also directed to other implementations comprising other possible combinations. Other structures, configurations, and implementations consistent with the scope of the claimed invention will be apparent to those skilled in the art from a consideration of the specification or practice of the invention disclosed herein. It is intended that the specification and the described examples are illustrative with the true scope of the invention being defined by the following claims.

What is claimed is:

1. A system for using a short-range wireless communication protocol to authenticate a mobile communication device on a cellular network, the system comprising:
   an antenna configured to receive incident radio-frequency signals using the short-range wireless communication protocol;
   an inductor configured to capture and rectify the incident radio-frequency signals received by the antenna from one of a plurality of mobile communication devices; and
   an integrated circuit, powered by the inductor, configured to:
      store subscriber identity information for a cellular network in a non-volatile storage module;
      transmit, using the antenna and the short-range wireless communication protocol, the subscriber identity information to a first mobile communication device;
      receive, using the antenna and the short-range wireless communication protocol, personal information associated with a user of the first mobile communication device;
      store the personal information associated with the user in the non-volatile storage module; and
      transmit, using the antenna and the short-range wireless communication protocol, the personal information associated with the user and the subscriber identity information for the cellular network to a second mobile communication device in the plurality of mobile communication devices for authentication on the cellular network,
   wherein the integrated circuit is further configured to:
      store second subscriber identity information for a second cellular network; and
      transmit the second subscriber identity information for the second cellular network to the second mobile communication device in the plurality of mobile communication devices.

2. The system of claim 1, wherein the integrated circuit comprises one or more registers for storing the personal data associated with the subscriber.

3. The system of claim 1, wherein the short-range wireless communication protocol used for transmitting the subscriber identity information for the cellular network uses radio frequency via near-field communication.

4. The system of claim 1, wherein the subscriber identity information of the non-volatile storage module comprises:
   a unique serial number (ICCID);
   an international mobile subscriber identity (IMSI); and
   security authentication information.

5. The system of claim 1, wherein a smart card comprises the antenna, the inductor, and the integrated circuit,
   wherein the smart card issued to the user by a provider of cellular network includes the subscriber identity information stored in the storage module, the smart card configured to transmit the subscriber identity information through near-field communication to the second mobile communication device in the plurality of mobile communication devices.

* * * * *